(12) United States Patent
Przybyl et al.

(10) Patent No.: US 12,428,117 B2
(45) Date of Patent: Sep. 30, 2025

(54) MARINE PROPULSION DEVICES HAVING ELECTRIC MOTORS AND METHODS FOR MAKING MARINE PROPULSION DEVICES HAVING ELECTRIC MOTORS

(71) Applicant: Brunswick Corporation, Mettawa, IL (US)

(72) Inventors: Andrew Przybyl, Berlin, WI (US); Brad Taylor, Stillwater, OK (US); Clint Szumal, Bruce Township, MI (US); William Wayne McEathron, Fond du Lac, WI (US); Wayne M. Jaszewski, West Bend, WI (US)

(73) Assignee: Brunswick Corporation, Mettawa, IL (US)

( * ) Notice: Subject to any disclaimer, the term of this patent is extended or adjusted under 35 U.S.C. 154(b) by 565 days.

(21) Appl. No.: 17/966,335

(22) Filed: Oct. 14, 2022

(65) Prior Publication Data

US 2023/0127117 A1    Apr. 27, 2023

Related U.S. Application Data

(60) Provisional application No. 63/271,515, filed on Oct. 25, 2021.

(51) Int. Cl.
*B63H 20/32*  (2006.01)
*B63H 21/17*  (2006.01)
*B63H 21/30*  (2006.01)

(52) U.S. Cl.
CPC ............. *B63H 20/32* (2013.01); *B63H 21/17* (2013.01); *B63H 21/30* (2013.01)

(58) Field of Classification Search
CPC ......... B63H 20/32; B63H 21/17; B63H 21/30
See application file for complete search history.

(56) References Cited

U.S. PATENT DOCUMENTS

| 1,764,388 A | 6/1930 | Buchet |
|---|---|---|
| 2,247,671 A | 7/1941 | Tepel |
| (Continued) | | |

FOREIGN PATENT DOCUMENTS

| DE | 102019213702 A1 | 3/2021 |
|---|---|---|
| EP | 775630 | 5/1997 |
| FR | 2542518 A1 | 9/1984 |

OTHER PUBLICATIONS

Declaration of Prior Art Submitted in Corresponding U.S. Appl. No. 17/671,041 on Feb. 14, 2022.

(Continued)

*Primary Examiner* — Stephen P Avila
(74) *Attorney, Agent, or Firm* — Andrus Intellectual Property Law, LLP

(57) ABSTRACT

A method for making a marine propulsion device. The method includes providing a drive housing that extends between a first end and a second end, whereby drive housing has a cavity that extends inwardly from the second end. The method further includes positioning a conductor within the drive housing, whereby the conductor is configured to conduct power for the marine propulsion device. The method further includes inserting a motor assembly into the cavity and electrically coupling the motor assembly and the conductor while the motor assembly is positioned in the cavity and without entering the cavity via the first end of the drive housing.

20 Claims, 12 Drawing Sheets

(56) References Cited

U.S. PATENT DOCUMENTS

| | | |
|---|---|---|
| 2,545,086 A | 3/1951 | Harris |
| 2,877,733 A | 3/1959 | Harris |
| 3,052,204 A | 9/1962 | Scivally |
| 4,066,032 A | 1/1978 | Travis |
| 4,226,432 A | 10/1980 | Nakamizo |
| 4,267,401 A | 5/1981 | Wilkinson |
| 4,632,487 A | 12/1986 | Wargula |
| 4,744,777 A | 5/1988 | Ferguson |
| 5,114,352 A | 5/1992 | Gahagen |
| 5,197,910 A | 3/1993 | Kanno |
| 5,235,138 A | 8/1993 | Shah |
| 5,445,545 A | 8/1995 | Draper |
| 5,510,577 A | 4/1996 | Corrigan |
| 5,831,217 A | 11/1998 | Jarvis |
| 6,521,840 B1 | 2/2003 | Kreutz |
| 6,923,134 B1 | 8/2005 | Vrudny |
| 6,966,806 B1 | 11/2005 | Bruestle et al. |
| 7,435,147 B1 | 10/2008 | Eichinger |
| 7,452,251 B2 | 11/2008 | Boebel |
| 7,659,699 B2 | 2/2010 | Boebel |
| 8,043,135 B1 | 10/2011 | Corn |
| 8,337,264 B2 | 12/2012 | Boebel |
| 8,529,305 B2 | 9/2013 | Lin |
| 8,628,091 B2 | 1/2014 | Davison |
| 9,446,830 B2 | 9/2016 | Hartmeyer et al. |
| 9,481,435 B1 | 11/2016 | Jaszewski et al. |
| 9,490,619 B2 | 11/2016 | Smith |
| 9,630,694 B1 | 4/2017 | Jaszewski |
| 9,701,383 B1 | 7/2017 | Stuber et al. |
| 9,718,526 B2 | 8/2017 | Biebach et al. |
| 9,789,946 B2 | 10/2017 | Biebach et al. |
| 9,815,541 B2 | 11/2017 | Biebach et al. |
| 9,853,465 B2 | 12/2017 | Biebach et al. |
| 9,896,172 B1 | 2/2018 | Pugh |
| 9,963,213 B1 | 5/2018 | Jaszewski et al. |
| 10,096,863 B2 | 10/2018 | Hartmeyer et al. |
| 10,124,870 B2 | 11/2018 | Bergmann et al. |
| 10,263,361 B1 | 4/2019 | Gretz |
| 10,266,244 B2 | 4/2019 | Bergmann et al. |
| 10,343,759 B2 | 7/2019 | Despineux |
| 10,351,220 B1 | 7/2019 | Witte |
| 10,384,757 B2 | 8/2019 | Mueller et al. |
| 10,421,363 B2 | 9/2019 | Biebach |
| 10,472,036 B2 | 11/2019 | Spengler et al. |
| 10,556,659 B2 | 2/2020 | Biebach et al. |
| 10,647,398 B2 | 5/2020 | Biebach |
| 10,862,087 B2 | 12/2020 | Hartmeyer |
| 10,926,853 B2 | 2/2021 | Despineux et al. |
| 10,981,637 B1 | 4/2021 | Alby et al. |
| 11,001,360 B2 | 5/2021 | Basler |
| 11,021,224 B2 | 6/2021 | Biebach |
| 11,040,761 B2 | 6/2021 | Biebach et al. |
| 11,066,141 B2 | 7/2021 | Despineux et al. |
| 11,091,241 B2 | 8/2021 | Despineux et al. |
| 11,155,322 B2 | 10/2021 | Baros |
| 11,572,145 B1 | 2/2023 | Andrasko |
| 11,866,137 B1 | 1/2024 | Jaszewski |
| 2009/0269994 A1 | 10/2009 | Alston |
| 2020/0017183 A1 | 1/2020 | He |
| 2021/0139124 A1* | 5/2021 | Culpi ............... B63H 20/32 |
| 2023/0182880 A1 | 6/2023 | Jaszewski |
| 2023/0257095 A1 | 8/2023 | Waldvogel |

OTHER PUBLICATIONS

EPropulsion Brand Products found online at https://www.epropulsion.com/who-we-are/, accessed Feb. 9, 2022.

Fergus, et al. Unpublished U.S. Appl. No. 17/487,116, filed Sep. 28, 2021.

Schmidt, et al. Unpublished U.S. Appl. No. 17/585,214, filed Jan. 26, 2022.

Schrank, et al. Unpublished U.S. Appl. No. 17/509,739, filed Oct. 25, 2021.

Seta, et al. Unpublished U.S. Appl. No. 17/554,540, filed Dec. 17, 2021.

Sawyer, et al. Unpublished U.S. Appl. No. 17/469,479, filed Sep. 8, 2021.

Amphenol. Sell sheet for RADLOK product line. Document created Oct. 23, 2014.

Amphenol. Sell sheet for SurLok product line. Document created Oct. 23, 2014.

Jaszewski, et al. Unpublished U.S. Appl. No. 17/550,463, filed Dec. 14, 2021.

* cited by examiner

MARINE PROPULSION DEVICES HAVING ELECTRIC MOTORS AND METHODS FOR MAKING MARINE PROPULSION DEVICES HAVING ELECTRIC MOTORS

CROSS-REFERENCE TO RELATED APPLICATIONS

This application claims priority to U.S. Provisional Patent Application No. 63/271,515, filed Oct. 25, 2021, which is hereby incorporated by reference in its entirety.

FIELD

The present disclosure generally relates to marine propulsion devices having electric motors and methods for making marine propulsion devices having electric motors.

BACKGROUND

The following U.S. patents and U.S. patent applications provide background information and are incorporated by reference in entirety.

U.S. Pat. No. 6,966,806 discloses a marine propulsion device made of first and second portions which are removably attachable to each other. The second portion is the leading edge portion of the nose cone and the drive shaft housing. The second portion is configured to crush more easily in response to an impact force than the first portion. This can be accomplished by making the second portion from a different material than the first portion, which can be aluminum, or by providing one or more crush boxes within the structure of the second portion to cause it to yield more quickly to an impact force and thus protect the first portion which is the more critical structure of the marine device.

U.S. Pat. No. 7,435,147 discloses a marine propulsion device provided with a breakaway skeg having first and second attachment points. The first and second attachment points are configured to result in the second attachment points disengaging from a gearcase or housing structure prior to the first attachment point. The arrangement of attachment points allows a reaction force at the second pin to be predetermined in a way that assures the detachment of the skeg from the housing structure prior to the detachment of the housing structure from another structure, such as the boat hull, or transom.

U.S. patent application Ser. No. 17/469,479, filed Sep. 8, 2021, discloses a propulsion device for rotating a propulsor to propel a marine vessel. The propulsion device includes a drive housing having a cavity that extends along a first central axis. A motor is positioned within the cavity. The motor rotates a shaft extending along a second central axis that is non-coaxial with the first central axis. The shaft is configured to rotate the propulsor to propel the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a method for making a marine propulsion device. The method includes providing a drive housing that extends between a first end and a second end, the drive housing having a cavity that extends inwardly from the second end. The method further includes positioning a conductor within the drive housing, the conductor being configured to conduct power for the marine propulsion device. The method further comprises inserting a motor assembly into the cavity and electrically coupling the motor assembly and the conductor while the motor assembly is positioned in the cavity and without entering the cavity via the first end of the drive housing.

In certain embodiments, the drive housing extends between the first end and the second end in a longitudinal direction and the motor assembly includes a connector for electrically coupling the motor assembly, where electrically coupling the motor assembly and the conductor includes moving the conductor in a vertical direction perpendicular to the longitudinal direction into engagement with the connector of the motor assembly. In further embodiments, electrically coupling the motor assembly and the conductor further includes threading a first end of the conductor into a threaded opening in the connector of the motor assembly. In further embodiments, the conductor is a rigid member extending between the first end and a second end, where electrically coupling the motor assembly and the conductor further includes rotating the conductor at a position closer to the second end of the conductor than to the first end of the conductor to thread the first end of the conductor into the threaded opening in the conductor. In further embodiments, the marine propulsion device is configured to be electrically coupled to a power source to power the motor assembly, further including electrically coupling the conductor to the power source via threads at the second end of the conductor.

In certain embodiments, the conductor is a first conductor and the method further includes positioning a second conductor within the drive housing, the second conductor being electrically isolated from the first conductor, the method further including electrically coupling the motor assembly and the second conductor while the motor assembly is positioned in the cavity and without entering the cavity via the first end of the drive housing.

In certain embodiments, the motor assembly includes a motor-side connector for electrically coupling the motor assembly, the method further including positioning a housing-side connector in the drive housing and electrically coupling the conductor to the housing-side connector, and the housing-side connector being positioned such inserting the motor assembly into the cavity until the motor-side connector and the housing-side connector mate electrically couples the motor assembly and the conductor. In certain embodiments, the housing-side connector is part of a connector body including two shells with the housing-side connector extending through one of the two shells, where electrically coupling the conductor and the housing-side connector includes sandwiching the conductor between the two shells such that the conductor is held in contact with the housing-side connector.

Another embodiment of the present disclosure generally relates to a marine propulsion device including a drive housing that extends between a first end and a second end in a longitudinal direction. A cavity extends inwardly from the second end into the drive housing. A conduit extends away from the cavity in a substantially vertical direction within the drive housing, the vertical direction being perpendicular to the longitudinal direction. A motor assembly is positioned within the cavity. A conductor includes a rigid member that extends within the conduit and is electrically coupled to the motor assembly and is configured to provide power to the motor assembly. The motor assembly and the conductor are configured to be electrically coupled from outside the cavity while the motor assembly is positioned within the cavity by virtue of the rigid member extending within the conduit that extends away from the cavity.

In certain embodiments, the conduit has a first end that opens into the cavity and the motor assembly includes a connector for electrically coupling the motor assembly. The connector is aligned in the longitudinal direction with the first end of the conduit when the motor assembly is positioned within the cavity. In further embodiments, the connector and the conductor are electrically coupled via threaded engagement therebetween.

In certain embodiments, the first end and the second end of the drive housing are separated by a first distance in the longitudinal direction. The cavity extends into the drive housing in the longitudinal direction by a second distance that is less than the first distance between the first end and the second end of the drive housing.

In certain embodiments, electrically coupling the motor assembly and the conductor prevents the motor assembly from being removed from the cavity.

In certain embodiments, the conductor is a first conductor and the marine propulsion device further includes a second conductor having a rigid member that extends through the conduit and is electrically coupled at one end with the motor assembly. The first conductor and the second conductor are electrically isolated from each other. In further embodiments, the marine propulsion device further includes a power source that provides power to the motor assembly via the first conductor and the second conductor.

Another embodiment of the present disclosure generally relates to a marine propulsion device configured to be powered by a power source. The marine propulsion device includes a drive housing that extends between a first end and a second end. A cavity extends inwardly from the second end into the drive housing. A housing-side connector is positioned within the cavity. A conductor has a first end electrically coupled to the housing-side connector and an opposite second end configured to be electrically coupled to the power source. A motor assembly is positioned within the cavity. The motor has a motor-side connector configured to mate with the housing-side connector when the motor assembly is moved towards the housing-side connector within the cavity. The motor assembly is electrically coupled to the power source by mating the motor-side connector and the housing-side connector.

In certain embodiments, the motor-side connector includes a pin and the housing-side connector comprises a socket configured to receive the pin therein.

In certain embodiments, a member extends away from the motor assembly to prevent rotational misalignment between the motor assembly and the drive housing to thereby ensure that the motor-side connector and the housing-side connector mate when the motor assembly is positioned within the cavity.

In certain embodiments, the housing-side connector is part of a connector body having two shells with the housing-side connector extending through one of the two shells. The first end of the conductor is sandwiched between the two shells so as to electrically couple the first end of conductor and the housing-side connector. In further embodiments, the drive housing extends between the first end and the second end in a longitudinal direction and a conduit extends away from the cavity in a substantially vertical direction within the drive housing, whereby the vertical direction is perpendicular to the longitudinal direction. The conductor includes a rigid member that extends within the conduit such that the motor assembly and the conductor are configured to be electrically coupled from outside the cavity while the motor assembly is positioned within the cavity by virtue of the rigid member extending within the conduit that extends away from the cavity.

BRIEF DESCRIPTION OF THE DRAWINGS

The present disclosure is described with reference to the following drawings.

DETAILED DISCLOSURE

Figure 1:
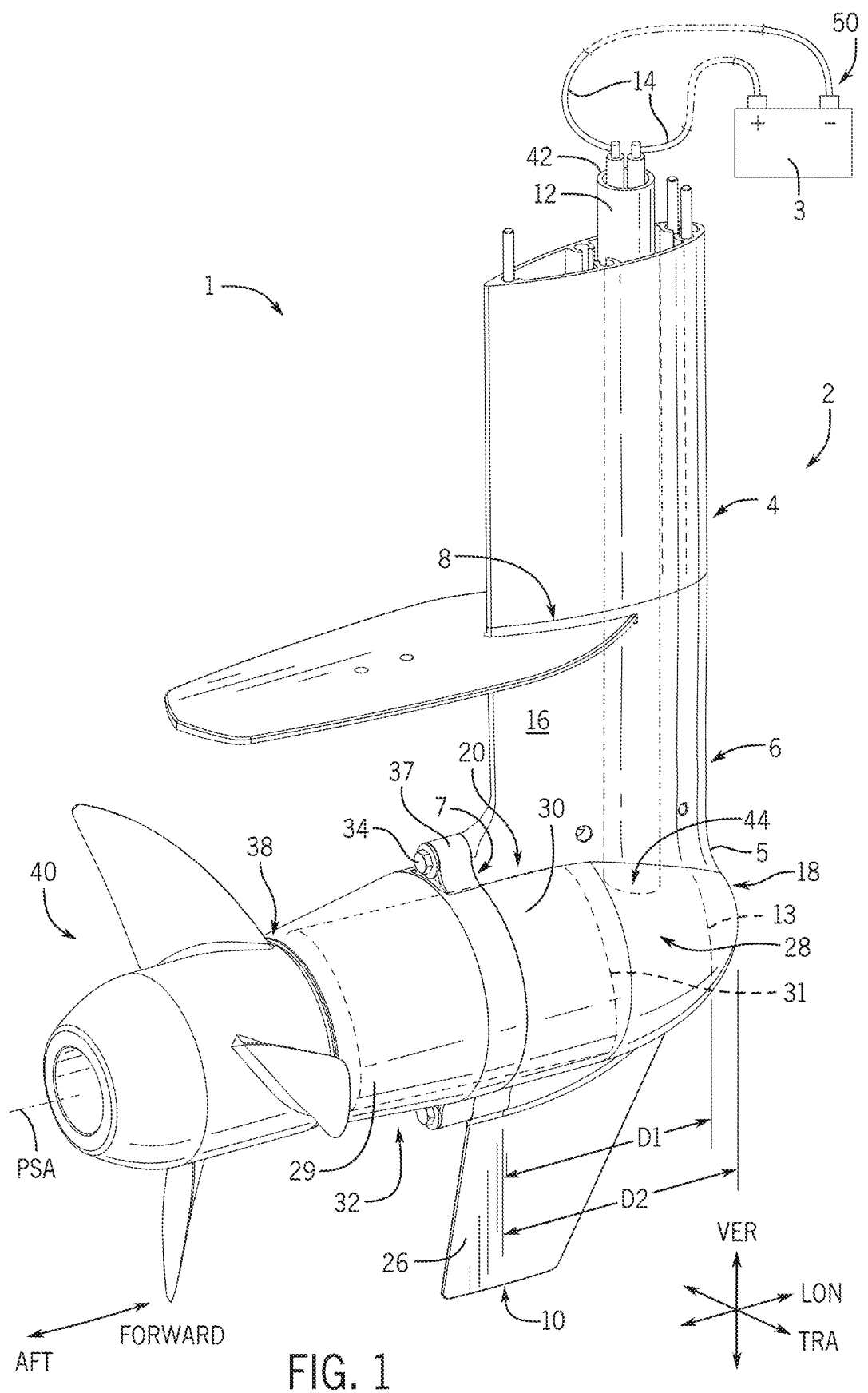
FIG. 1 is a rear perspective partial view of a marine propulsion device according to the present disclosure.

The present disclosure generally relates to marine propulsion devices, and specifically to marine propulsion devices that have electric motors positioned within their drive housings. FIG. 1 depicts a lower portion of a marine propulsion device 1 according to the present disclosure, which includes a drive housing 2 having an upper casing 4 and a lower casing 6 that are coupled together in a manner known in the art. The upper casing 4 and the lower casing 6 may alternatively be integrally formed together. The drive housing 2 is configured to be coupled to, or otherwise integrated within, a marine vessel in a manner known in the art.

Figure 2:
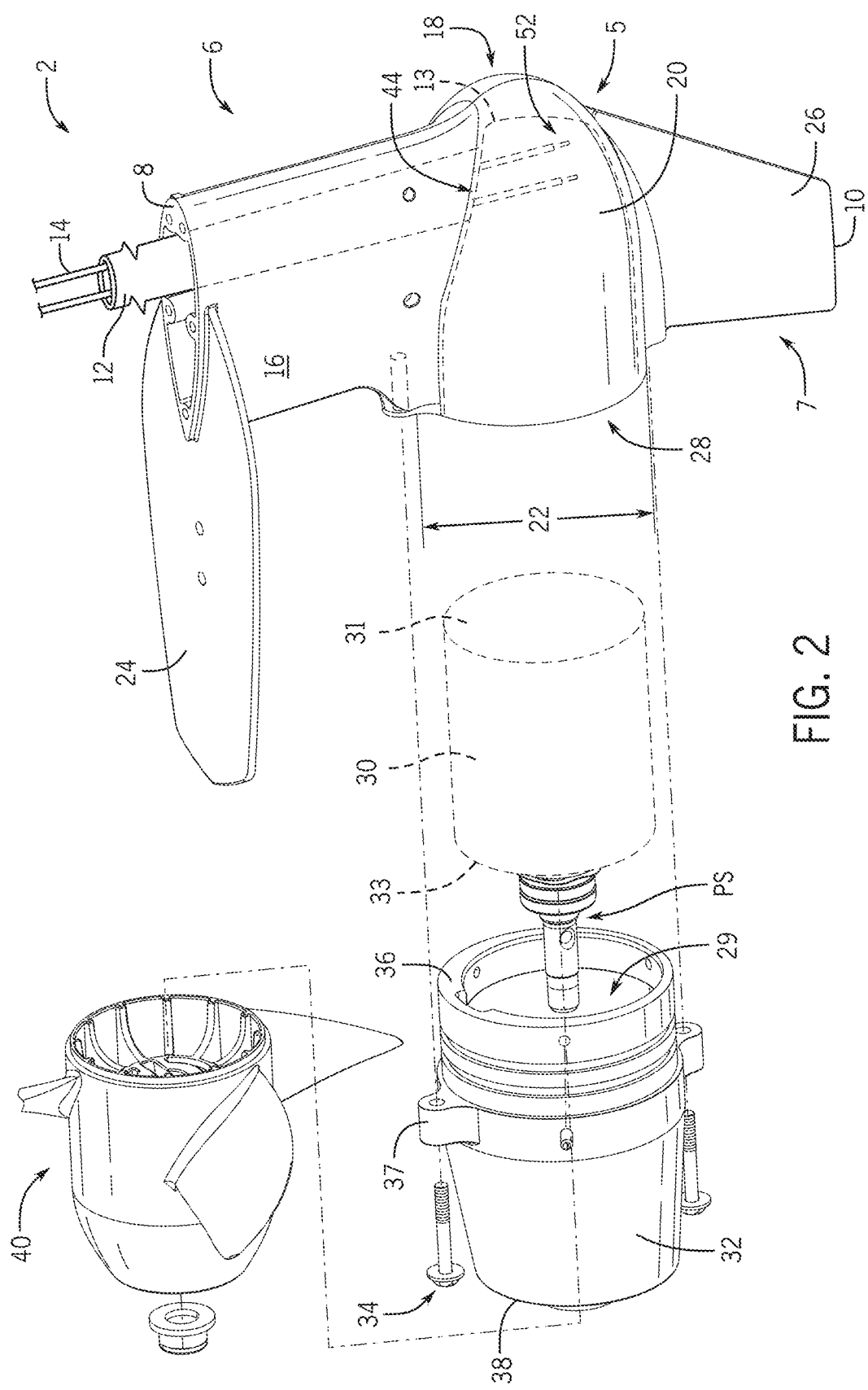
FIG. 2 is an exploded view of the propulsion device of FIG. 1.

Referring to FIGS. 1 and 2, the lower casing 6 extends in a vertical direction VER between a top 8 and a bottom 10, and in a longitudinal direction LON between a first end 5 and a second end 7 with sides 16 therebetween. The first end 5 and the second end 7 of the lower casing 6 may also be considered the first and second ends of the drive housing 2 generally unless otherwise stated. The longitudinal direction LON is defined to be perpendicular to the vertical direction VER, which are each perpendicular to a transverse direction TRA. The lower casing 6 also includes a nose cone 18 at the first end 5 that smoothly transitions to a curved exterior, shown here as a torpedo 20. The torpedo 20 extends radially outwardly from the sides 16 and has an outer diameter 22. The lower casing 6 further includes an anti-ventilation plate 24 and a skeg 26.

A cavity 28 extends inwardly from the second end 7 of the lower casing 6 towards the first end 5, particularly within the region of the torpedo 20, and terminates at a wall 13. A distance D1 between the second end 7 and the wall 13 in the longitudinal direction LON is less than a distance D2 between the second end 7 and the first end 5 of the lower casing 6. As such, it should be recognized that the cavity 28 is inaccessible from the first end 5 of the lower casing 6.

The cavity 28 is sized and shaped such that a motor assembly 30 can be at least partially positioned therein when the marine propulsion device 1 is fully assembly. The motor assembly 30 may include an electric motor that provides rotation when powered, as well as a housing, control board, power board, transformer, bearings, rotation sensors, current sensors, and/or other elements conventionally packaged as an assembly. The electric motor within the motor assembly 30 may be an axial flux motor, a radial flux motor, or a transverse flux motor such as those produced by Electric Torque Machines of Flagstaff, Arizona (a Graco Company).

The motor assembly 30 extends between a first end 31 and an opposite second end 33. A propeller shaft PS extends perpendicularly away from the second end 33 of the motor assembly 30 and is rotatable through operation of the motor assembly 30. The motor assembly 30 may be coupled to the drive housing 2 in a manner known in the art. In the configuration of FIGS. 1 and 2, the motor assembly 30 is not entirely positioned within the cavity 28 when coupled to the drive housing 2. Rather, the first end 31 of the motor assembly 30 is positioned in the cavity 28 with the second end 33 of the motor assembly 30 extending of the second end 7 of the drive housing 2.

With continued reference to FIGS. 1 and 2, a collar 32 extends in the longitudinal direction LON between a first end 36 and a second end 38 with a flange 37 positioned therebetween. The collar 32 is removably coupled to drive housing 2 such that the flange 37 of the collar 32 abuts the second end 7 of the drive housing 2 and the first end 36 of the collar 32 is inside the drive housing 2. In particular, fasteners 34 (e.g., bolts or screws) extend through openings in the flange 37 and are received in openings defined in the drive housing 2 to draw the collar 32 tightly against the second end 7 of the drive housing 2. The collar 32 has a circular cross-section and is generally aligned with the torpedo 20 of the drive housing 2.

A cavity 29 is formed within the collar 32, extending from the first end 36 towards a second end 38. The cavity 29 is sized and shaped such that the portion of the motor assembly 30 that remains aft of the drive housing 2 is positioned within the cavity 29 when the collar 32 is coupled to the drive housing 2. Seals (not shown) are provided on the exterior of the collar 32 between the flange 35 and the first end 36 to ensure that the collar 32 and drive housing 2 have a water-tight connection. The propeller shaft PS of the motor assembly 30 extends through an opening in the second end 38 of the collar 32 when the collar 32 is coupled to the drive housing 2 with the motor assembly 30 positioned within the cavity 28 in the drive housing 2 and the cavity 29 in the collar 32.

With continued reference to FIGS. 1 and 2, a propeller 40 is operatively coupled to the propeller shaft PS of the motor assembly 30, which is rotated by a propeller shaft axis PSA to provide propulsion for a marine vessel in water. The propeller 40 is positioned against the second end 38 of the collar 32 such that the collar 32 is sandwiched between the propeller 40 and the drive housing 2 when assembled. A seal (not shown) may also be provided between the propeller 40 and the second end 38 of the collar 32 to prevent water ingress. Rotation may be transmitted from the motor assembly 30 to the propeller 40 in a manner known in the art, including directly connecting to a motor shaft extending from the motor, or indirectly through gears, pulleys, or additional shafts with couplers, for example.

It should be recognized that while the present disclosure primarily shows the propeller 40 being aft of the drive housing 2, the present disclosure also relates to other types and configurations of propulsion devices, including tractor or pulling type propulsion devices.

Additional information is now provided regarding electrically coupling the motor assembly 30 so as to receive power and/or control signals when coupled within the drive housing 2. Referring to FIGS. 1 and 2, a conduit 12 has a first end 42 and a second end 44 and extends through the drive housing 2, here primarily in the vertical direction. The second end 44 of the conduit 12 opens into the cavity 28 within the drive housing 2. One or more conductors 14 each extend between a first end 50 and a second end 52 (FIG. 2), which may be wires or rigid members as discussed further below. The conductor or conductors 14 extend through the conduit 12 from above the lower casing 6 of the drive housing 2 such that the second ends 52 are positioned in the cavity 28. The number of conductors 14 may vary from what is shown with the conductors being electrically isolated from each other.

The conduit 12 may also be used to vent pressure within the drive housing 2. It should be recognized that the present disclosure also contemplates configurations in which multiple conduits are used (e.g., one for communication conductors and another for power conductors, separate conduits for each power conductor, or other combinations thereof). The power may be provided by a power source 3 (FIG. 1), for example one or more batteries or other energy storage systems, and/or energy production systems (e.g., wind power systems, solar power systems, or a gas generator).

Figure 3:
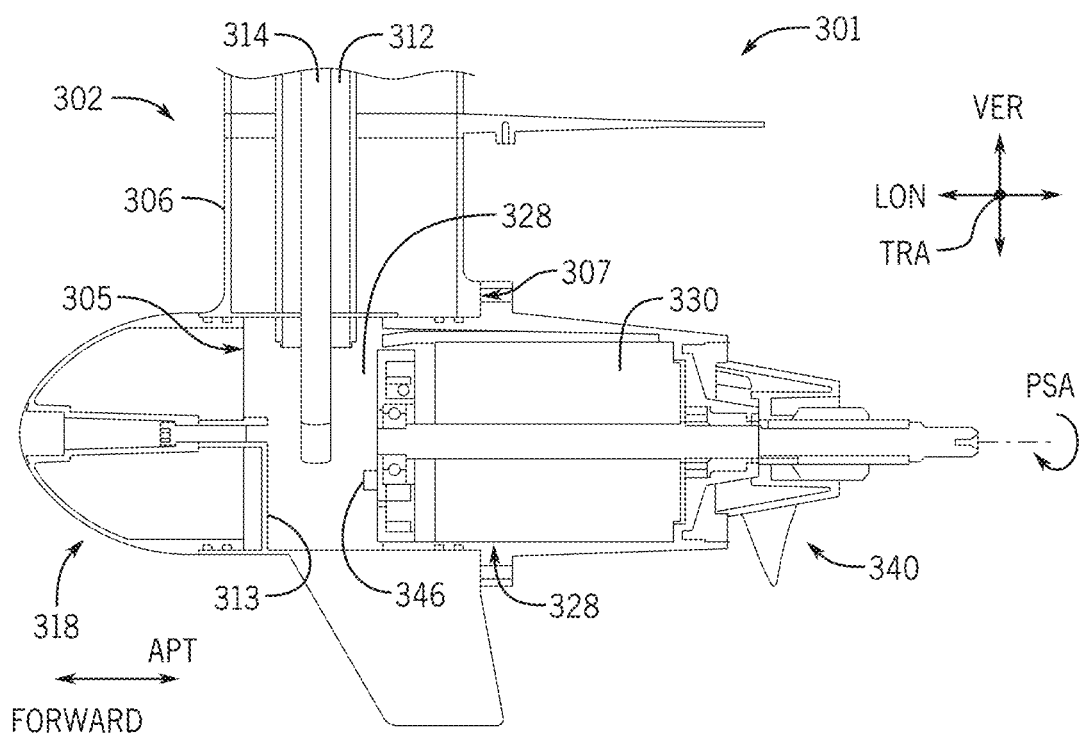
FIG. 3 is a sectional side view of a marine propulsion device known in the art.
Figure 4:
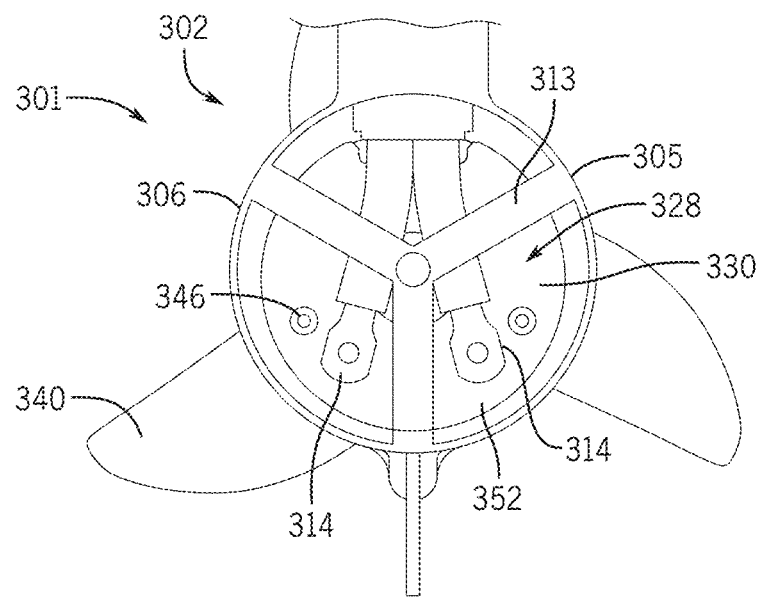
FIG. 4 is a front view of the propulsion device of FIG. 3 with a nose cone removed.

Reference is now made to FIGS. 3 and 4 for describing wiring techniques presently known in the art for electrically coupling conductors to electric motors. For propulsion devices presently known in the art, conductors 314 are fed into a cavity 328 in the lower casing 306 of the drive housing 302 to be manually coupled to connections 346 on the motor assembly 330. The conductors 314 are electrically coupled to the connections 346 on the motor assembly 330 in a conventional manner (e.g., via screws, nuts, or other methods known in the art).

For some propulsion devices known in the art, and particularly those in which the motor assembly 330 is connected before inserting the motor assembly 330 into a second end 307 of the lower casing 306, sufficient slack is needed in the conductors 314 to permit making these connections to the motor assembly 330. Once connected to the conductors 314, the motor assembly 330 is inserted in a longitudinal direction LON into the cavity 328 of the drive housing 302.

The present inventors have recognized problems with electrically connecting and installing motors in this manner. These problems are further exacerbated by the demand for increasingly more powerful motors. In particular, the conductors 314 used in propulsion devices presently known in the art are flexible (e.g., 4-gauge or lighter), allowing them to be bent as necessary to transition from the vertically-oriented conduit 312 (extending in a vertical direction VER perpendicular to the longitudinal direction LON) to horizontally (extending in the longitudinal direction LON) out the second end 307 of the drive housing 302 for connection to the motor assembly 330. There must also be sufficient space somewhere within the marine propulsion device 301, and sufficient flexibility in the conductor 314, to accommodate the no-longer-needed slack in the conductor 314 after the motor assembly 330 is inserted into the cavity 328, which may be an additional 1-2 feet of each of the conductors 314.

Moreover, while flexible conductors 314 may be sufficient for lower-power motor assemblies 330 (e.g., 8 HP or 6 kW), they are insufficient for motor assemblies 330 approaching the 10 or 15 HP equivalent range (7.5 kW, 11.2 kW, respectively). The present inventors have identified that these more powerful motor assemblies require conductors 314 capable of handling currents in excess of 300 amps, and thus must be 2/0 or 3/0 (or heavier). Conductors of this gauge are not as flexible or require a larger bending radius. Therefore, these conductors cannot be bent and withdrawn from the second end 307 of the drive housing 302 to connect to the motor assembly 330 prior to installing the motor assembly 330 in the drive housing 302.

The present inventors have also identified problems with known techniques of connecting the conductors 314 to the motor assembly 330 before the motor assembly 330 is positioned in the drive housing 302, even where the conductor 314 has a low enough gauge to provide this flexibility. After connecting the conductors 314 to the motor assembly 330, an installer typically greases the conductors 314 to reduce friction, often using lubricant or soap. The installer must then pull upwardly on the conductors 314 from above the lower casing 306 while concurrently inserting the motor assembly 330 into the cavity 328 so as to take up the slack in the conductors 314 in real-time. This technique typically requires the installer to reach 3 feet (0.9 meters) or more between the motor assembly 330 and the top of the conduit 312 while also pulling the conductors 314 therethrough. This risks damage to the conductor 314, is time-consuming, and is non-ergonomic for the installers.

Another prior art configuration, shown in FIGS. 3 and 4, connects the conductor 314 to the connections 346 on the motor assembly 330 after the motor assembly 330 is positioned in the cavity 328 of the drive housing 302. In this case, the nose cone 318 of the marine propulsion device 301 is removably coupled to the first end 305 of the drive housing 302 opposite the second end 307 in which the motor assembly 330 is inserted. Removing the nose cone 318 from the drive housing 302 provides access to the second ends 352 of the conductors 314, as well as to the connections 346 of the motor assembly 330. In this manner, the installer enters the cavity 328 of the drive housing 302 from the first end 305 thereof, electrically coupling the conductors 314 to the connections 346 in a conventional manner (e.g., with screws and ring-terminals). Once the connections are made, the removable nose cone 318 is once again coupled to the first end 305 of the drive housing 2, for example via a fastener (e.g., a screw or bolt).

The present inventors have also identified problems with this design and technique. In particular, removable nose cones add cost, complication, and are prone to problems, including water ingress. The removable nose cone design also increases the likelihood of the propulsion device getting caught on debris in the water, such as submerged logs, based on the extended geometry, connection points, and fasteners used to fix the removable nose cone to the drive housing. Moreover, propulsion devices with removable nose cones tend to be physically larger than those with nose cones integrated into the drive housing (e.g., FIG. 1), thereby having greater drag and less maneuverability.

Through experimentation and research, the present inventors have developed the presently disclosed marine propulsion devices and methods for electrically coupling motor assemblies. In particular, the present disclosure provides for coupling a motor assembly while it is positioned within a cavity in a drive housing, and without entering the cavity via the end opposite the end in which the motor assembly is inserted. As such, the present disclosure provides for electrically coupling a motor assembly positioned in the cavity of a drive housing with a fixed or non-removable nose cone. Moreover, the present disclosure provides for the use of inflexible conductors where needed or desired, enabling the production of marine propulsion devices with higher power requirements. It should be recognized that the term "conductor" is used herein to describe any conductive material between a motor assembly and a power source, including rigid bar stock such as a bus bar, stranded and/or solid flexible conductors such as wires, and/or other conductors known in the art.

Figure 7:
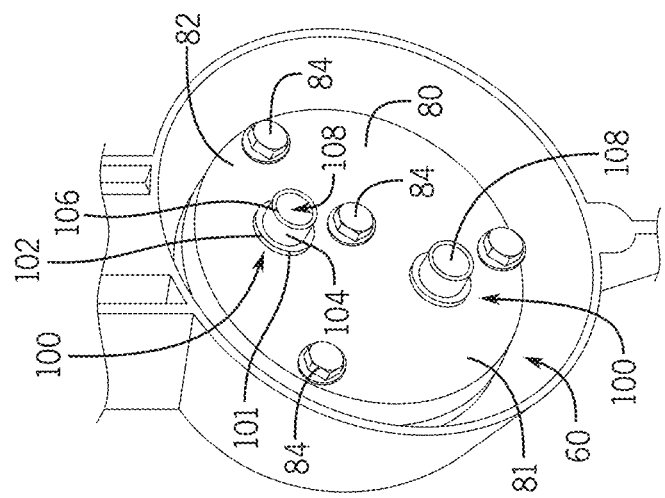
FIG. 7 is rear perspective view of the lower casing of FIG. 6 with the remaining part of the connector body installed therein.
Figure 6:
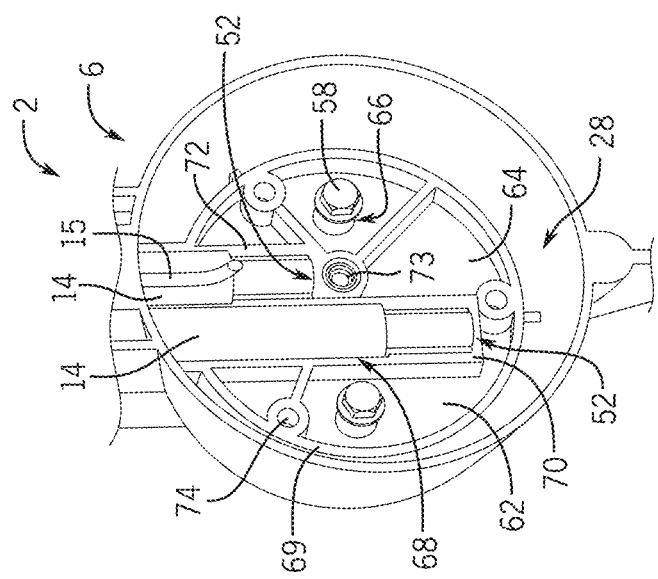
FIG. 6 is rear perspective view of the lower casing of FIG. 5 with part of a connector body installed therein.
Figure 5:
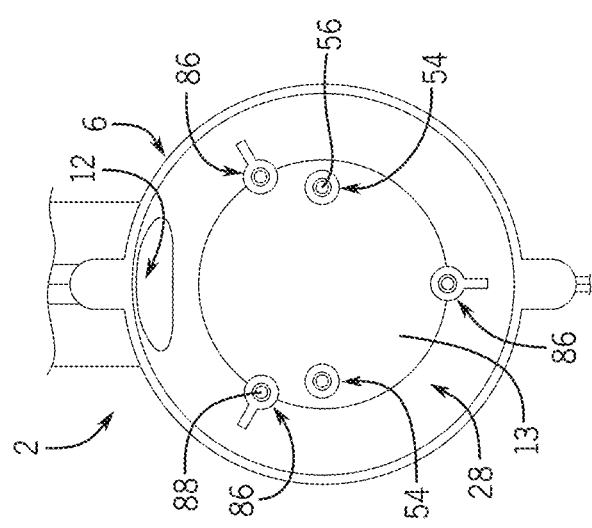
FIG. 5 is a rear view of the lower casing of one example of a marine propulsion device according to the present disclosure.

Addition information is now provided for different configurations and methods for electrically coupling a motor assembly and a conductor according to the present disclosure, such as for the marine propulsion device of FIG. 1. FIGS. 5-7 depict a portion of a lower casing 6 of a drive housing 2 configured according to the present disclosure. FIG. 5 is a view looking into the cavity 28 of the drive housing 2, which has been cut along a cross-section between the first end of the drive housing and the second end of the drive housing. The wall 13 at the end of the cavity 28 includes bosses 54 extending aftwardly therefrom in the longitudinal direction (i.e., out of the page). The bosses 54 have threaded openings 56 therein for receiving fasteners 58. Additional bosses 86 are also provided with threaded openings 88 for receiving additional fasteners 84, as discussed further below. As will become apparent, the bosses 54 are configured for attaching a connector body 60 to the drive housing, whereby the connector body 60 provides for connecting the conductors to the motor assembly.

A connector body 60 is shown in FIGS. 6-7, which is formed by two shells that when fixed together sandwich the conductors 14 therein. With particular reference to FIG. 6, the two shells include a first shell 62 with a base 64 having openings 66 and openings 74 therethrough, and a threaded opening 73 therein. The first shell 62 is fixed to the lower casing 6 via fasteners 58 (e.g., screws, bolts, or barbed press-fit fasteners) that extend through the openings 66 in the first shell 62 and into the openings 56 (see FIG. 5) in the wall 13 of the cavity 28.

Referring to FIG. 6, side walls 68 extend rearwardly and perpendicularly from the base 64 of the first shell 62, forming a channel 72 therebetween. End walls 70 also extend from the base 64 between the side walls 68, here connecting the side walls 68 and being perpendicular to both the side walls 68 and the base 64. Each of the channels 72 is sized and shaped to correspond to at least a portion of one of the conductors 14. In this manner, each of the conductors 14 is positioned within one of the channels 72 and bounded on the sides by the side walls 68. The second end 52 of the conductor 14 abuts the end wall 70 of its respective channel 72.

The first shell 62 of FIG. 6 includes two channels 72 corresponding to two conductors 14 for providing power to the motor assembly, whereby separate additional conductors 15 provided for communication are not provided with channels 72. However, it should be recognized that channels may be provided for differing numbers and types of conductors, including for the additional conductors 15. The geometric configuration of each channel may vary for different gauges and lengths of conductors. An additional side wall 69 is also provided extending perpendicularly from the base 64 along the perimeter of the first shell 62 for additional strength and to abut a similar wall on the second shell when coupled together as a connector body.

FIG. 7 shows an outside 81 of a second shell 80 configured fixed to the first shell 62 to form the connector body 60. Openings 82 are provided through the second shell 80 and are configured to receive fasteners 84 therethrough (e.g., screws, bolts, or barbed press-fit fasteners). The second shell 80 is fixed to the first shell 62 by engaging the fasteners 84, some threading into the openings 73 in the first shell 62, and others extending through openings 74 in the first shell 62 and threading into the openings 88 in the bosses 86 in the lower casing 6 (see FIG. 5). It should be recognized that while the connector body 60 having a generally circular shape is convenient for positioning a similarly shaped cavity 28, other shapes and configurations are also contemplated by the present disclosure (e.g., a connector body 60 comprising square-shaped shells, or shells having different shapes than each other).

Figure 9:
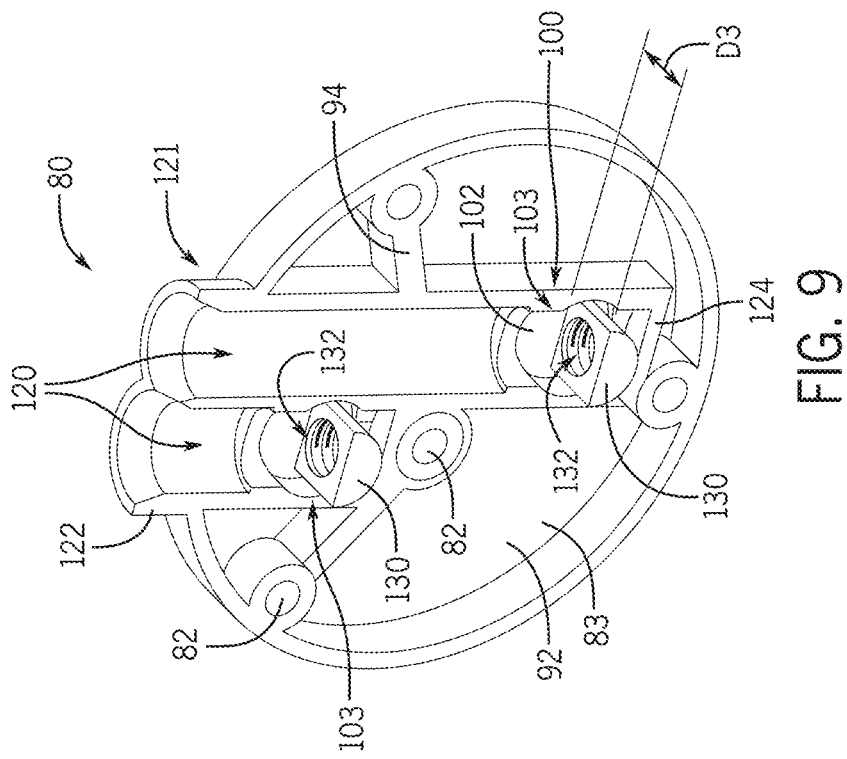
FIGS. 8 and 9 are rear perspective views of two examples of the remaining part of the connector body separate from the connector body of FIG. 7.
Figure 8:
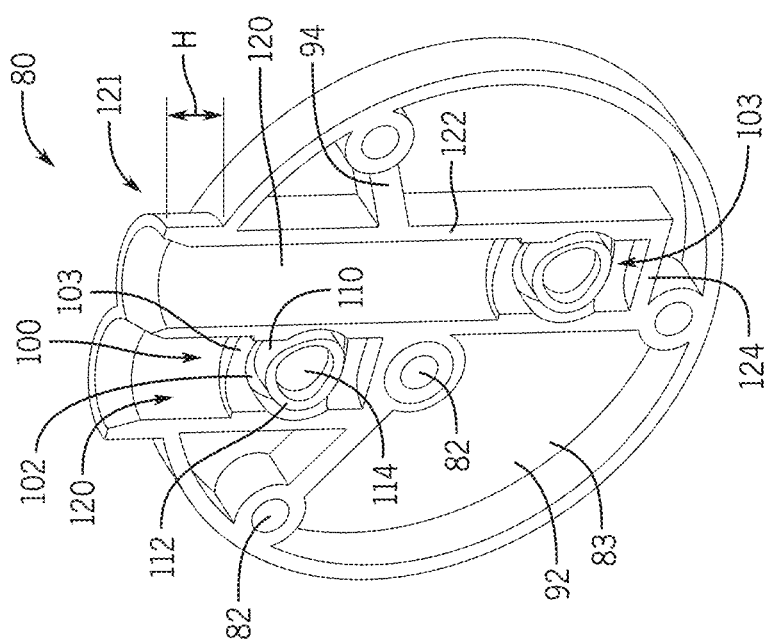

The outside 81 of the second shell 80 further includes connectors, also referred to as housing-side connectors 100, for electrically couple the conductors 14 inside the connector body 60 to the motor assembly outside the connector body 60 (the motor assembly having connectors discussed further below). The housing-side connector 100 has an outside contact 101 that is on the outside 81 of the second shell 80 and an opposite inside contact 103 that extends through the second shell 80 to the inside 83 of the second shell 80 opposite the outside 81 thereof (FIGS. 8 and 9). The outside contact 101 is formed by a base 102 with a wall 104 that extends perpendicularly outwardly to an edge 106. The wall 104, which here forms a cylinder, defines a cavity 108 therein for receiving a corresponding connector on the motor assembly. In this manner, the housing-side connector 100 forms a socket for a socket-pin type arrangement, such as the RADLOK connector as produced by Amphenol®. While the outside contact 101 is shown to be a socket, it should be recognized that the connector orientation may vary, including reversing the arrangements of the socket and pin.

FIGS. 8 and 9 show the inside 83 of two embodiments of second shells 80 separated from the first shell 62. In each case the second shell 80 includes a base 92 through which the openings 82 discussed above extend for coupling the second shell 80 to the first shell 62 and to the drive housing 2 (FIGS. 5-6). The openings 82 may extend through raised bosses and/or supported by ribs 94 for additional rigidity. Likewise, a wall 85 extends perpendicularly from the base 92 around the perimeter of the second shell 80, whereby the wall 85 is configured to abut the walls 69 around the perimeter of the first shell 62 when coupled together as the connector body 60.

For the second shells 80 of both FIG. 8 and FIG. 9, the inside contact 103 of the housing-side connector 100 extends perpendicularly away from the base 92 of the second shell 80. The housing-side connectors 100 may be integrally formed via injection molding through the second shell 80, whereby the second shell 80 is made of plastic, fiberglass, or another non-conductive materials, by way of example. The inside contacts 103 are positioned within channels 120 formed by side walls 122 and an end wall 124 that extend perpendicularly from the base 92 of the second shell 80, similar to the channels 72 of the first shell 62 (FIG. 6). The channels 120 may continue through an extension 121 that projects beyond the otherwise circular shape of the connection body 60, here by a height H. The channels 120 are semi-cylindrically shaped such that each may accommodate half of a conductor 14 being positioned therein when the connector body 60 is closed (the other half being contained within a similar channel in the first shell 62).

The mechanism by which the conductors 14 are electrically connected to the inside contacts 103 of the housing-side connectors 100 vary between the embodiments of FIGS. 8 and 9. For the second shell 80 of FIG. 8, the inside contact 103 is formed by a base 102 with a wall 110 extending perpendicularly away from the base 102 to a front edge 112. The wall 110, which is cylindrically shaped, defines a cavity 114 therein. In certain embodiments, the front edges 112 are contoured to match the shape of the conductor 14 such that an even force is applied by the connector 100 on the conductors 14 when the second shell 80 is fixed to the first shell 62. It should be recognized that the present disclosure contemplates configurations in which the front edges 112 pierce an insulator on the conductor 14 when the second shell 80 is closed, and configurations in which the conductor 14 is exposed where contacting the front edge 112.

In this manner, the electrical connections between the conductors 14 and the housing-side connectors 100 for the connector body 60 of FIG. 8 are made via compression when the first shell 62 and the second shell 80 are coupled together. This compression also ensures that the conductors 14 are held in contact with the housing-side connector 100 over time.

In contrast, the housing-side connector 100 for the second shell 80 shown in FIG. 9 is electrically coupled to the conductors 14 via threaded engagement. In particular, the inside contact 103 of the housing-side connector 100 is formed by a plate or member 130 that extends perpendicularly from the base 102 of the housing-side connector 100. Each member 130 includes a threaded opening 132 that extends in the vertical direction VER into the member 130. In this configuration, the conductors 14 that each configured to have threads at the second ends 52 (FIG. 6) to correspond with the openings 132 in the members 130. The member 130 extends from the base 102 by a depth D3 so as to not conflict with the connector body 60 closing.

The present inventors have recognized that one advantage of the second shell 80 of FIG. 9 is that the conductors 14 may be electrically coupled to the housing-side connectors 100 of the connector body 60 after the connector body 60 is already coupled to the drive housing 2. In particular, the connector body 60 is configured such that when coupled to the drive housing 2, the openings 132 in the members 130 of the inside contacts 103 for the housing-side connectors 100 are aligned in the longitudinal direction LON and the transverse direction TRA with the conduit 12 where the conduit 12 opens into the cavity 28 (see FIG. 2). The conductors 14 are then threaded into engagement with the openings 132 of the housing-side connectors 100 from above. Additional information regarding conductors 14 that are engaged rotationally is provided below.

Figure 10:
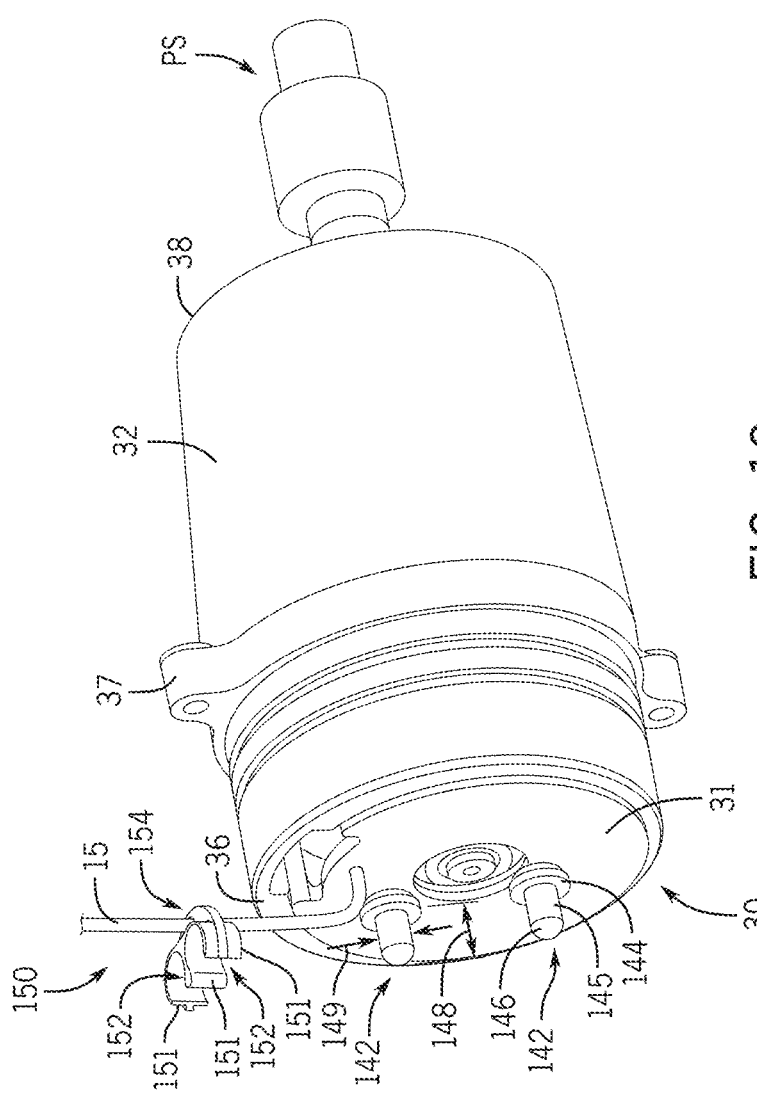
FIG. 10 is a front perspective view of one example of a motor configured according to the present disclosure.

FIG. 10 shows a motor assembly 30 according to the present disclosure, which is configured to be electrically coupled via press-fit arrangement. The motor assembly 30 has motor-side connectors 142 that extend perpendicularly away from the first end 31 of the motor assembly 30. The motor-side connectors 142 correspond to the housing-side connectors 100 of the connector body 60, here the motor-side connectors 142 being pins to correspond to the sockets of the housing-side connectors 100 of FIGS. 8 and 9. The motor-side connectors 142 are electrically connected to electrical components within the motor assembly 30 (e.g., a power control board) such that providing power to the motor-side connectors 142 causes the electric motor within the motor assembly 30 to rotate.

The connectors 142 have bases 144 coupled to the first end 31 of the motor assembly 30, along with walls 145 that extend perpendicularly away from the bases 144 by a length 148 to an end 146. The ends 146 may have a rounded or tapered shape to assist in the connectors 142 properly aligning with the housing-side connectors 100. The walls 145 are cylindrically shaped and have an outer diameter 149 corresponding to the inner diameters of the cavity 108 within the housing-side connectors 100 on the connector body 60. The length 148 is also configured such that the connector 142 fully engages the connector 100 of the connector body 60 when the motor assembly 30 is positioned in the lower casing 6 and the collar 32 is connected thereto.

In this manner, the connectors 142 of the motor assembly 30 are aligned with the connectors 100 of the connector body 60 such that an electrical connection is made between the connector body 60 and motor assembly 30 simply by inserting the motor assembly 30 within the lower casing 6.

Figure 11:
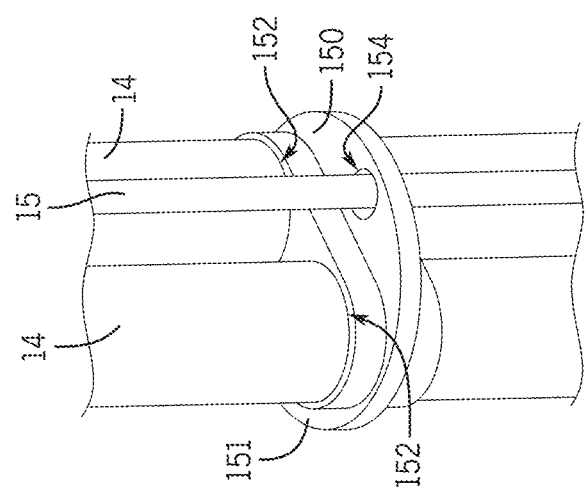
FIG. 11 is a rear perspective view of a clamp for fixing an additional wire according to the present disclosure.

FIGS. 10 and 11 further show an additional conductor 15 used for controlling the motor assembly 30 in a conventional manner. The additional conductor 15 is shown hardwired to the motor assembly 30. The additional conductor 15 may alternatively be connected to the motor assembly 30 via a conventional connector 166 received within a conventional socket 168 (see FIGS. 13A and 14A), which by way of example may be a Scuba connector or Deutsch connector.

FIGS. 10 and 11 further show a clamp 150 for retaining the conductor 15 and the conductors 14 together as a neat bundle. The clamp 150 extends between a top and a bottom with an opening 154 therethrough. The additional conductor 15 extends through the opening 154 such that the clamp 150 is captured and remains with the additional conductor 15. The clamp 150 also includes two or more arms 151 that together form one or more partially enclosed, circular openings 152. The openings 152 are sized and shaped to correspond to the size and shape of the conductors 14, here with the inner diameter of the openings 152 being the same or slightly smaller than the outer diameter of the conductors 14. The clamp 150 is made of a non-conductive, compliant material, such as plastic, which allows the clamp 150 to be removably clipped onto the conductors 14 for fixation and cable management purposes. No tools are required, and thus the process for securing the additional conductor 15 within the marine propulsion device 1 is fast and simple.

Figure 12:
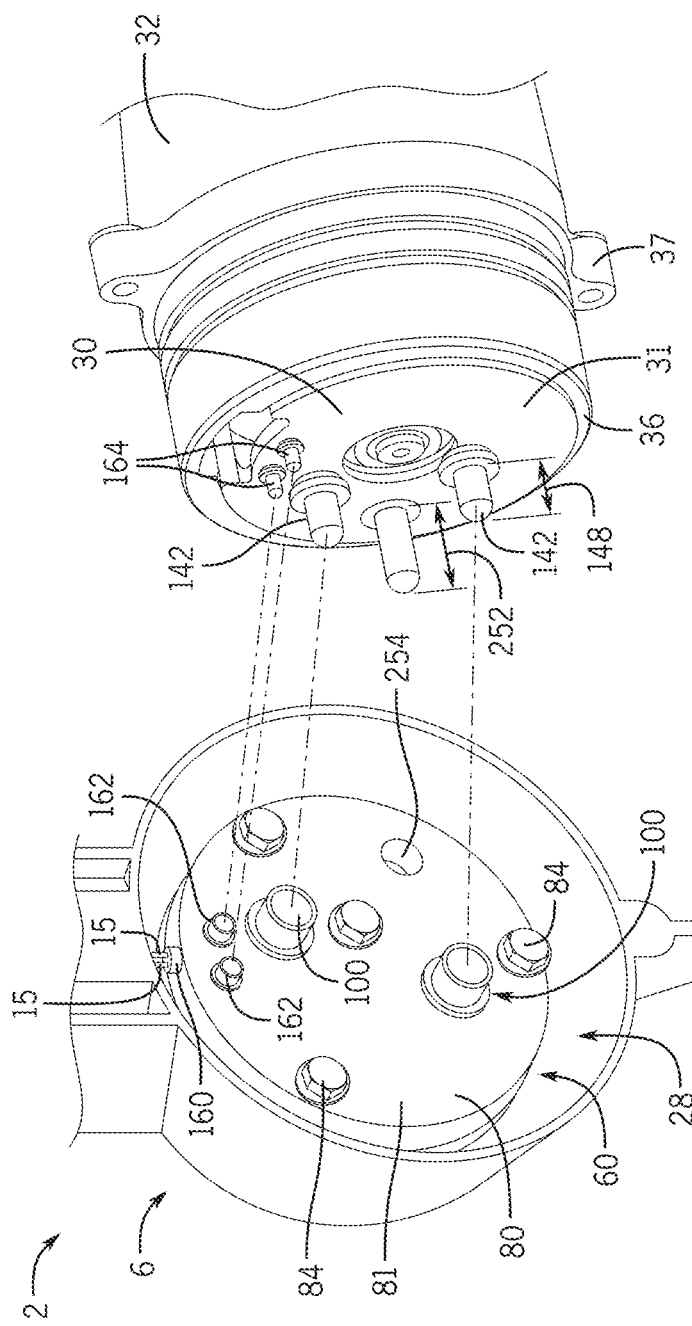
FIG. 12 is a partial exploded view of another example of a marine propulsion device according to the present disclosure.

FIG. 12 shows another configuration of connector body 60 and motor assembly 30 according to the present disclosure. This embodiment provides for a socket/pin type connection for electrically coupling the additional conductor 15 for controlling the motor assembly 30 similar to those for the conductors 14 carrying power to the motor assembly 30. The connector body 60 is now configured to also sandwich the additional conductors 15 between the first shell 62 and the second shell 80 using one of the techniques previously discussed for the conductors 14 (e.g., via compression or threaded engagement). The additional conductors 15 are retained within one or more channels 160 that exit out the top of the connector body 60. The channels 160 may be configured in the same manner as the channels 72 discussed above (see FIG. 6). The additional conductors 15 are electrically coupled to housing-side connectors 162, which in the present configuration vary from the housing-side connectors 100 discussed above primarily in location and size.

Likewise, motor-side connectors 164 are provided on the motor assembly 30 in a similar manner as the motor-side connectors 142 previously discussed. The motor-side connectors 164 are sized, shaped, and positioned (as with the motor-side connectors 142) to automatically engage with the housing-side connectors 162 on the connector body 60 when the motor assembly 30 is inserted into the cavity 28 of the drive housing. In this manner, the embodiment of FIG. 12 provides that all electrical connections to the motor assembly 30, including both power and communication, are automatically made when the motor assembly 30 is moved towards the connector body 60 when inserting the motor assembly 30 into the cavity of the drive housing 2, particularly until the housing-side connectors 100, 162 mate with the motor-side connectors 142, 164, respectively.

The configuration of FIG. 12 also includes a mechanism for preventing rotational misalignment between the motor assembly 30 and the drive housing 2 to thereby ensure that the motor-side connectors 142, 164 and the housing-side connectors 100, 162 mate when the motor assembly 30 is positioned within the cavity 28. In particular, a member 250 extends perpendicularly away from the first end 31 of the motor assembly 30 by a length 252. The length 252 of the member 250 is longer than the length 148 of the motor-side connector 142. The member 250 need not be conductive and may instead be made of plastic or resin materials. The member 250 may otherwise be the same as the motor-side connector 142.

The member 250 is configured to be positioned within an opening 254 in connector body 60. Since the length 252 of the member 250 is greater than the length 148 of the motor-side connectors 142 (and also longer than the distances of the motor-side connectors 164), the member 250 prevents the mating between housing-side connectors 100, 162 and motor-side connectors 142, 164, respectively, unless the member 250 is aligned so as to be received within the opening 254 in the connector body 60. This ensures rotational alignment of the motor assembly 30 within the cavity 28 to thereby ensure alignment between housing-side connectors 100, 162 and motor-side connectors 142, 164, respectively for successful mating and preventing damage. The present disclosure contemplates other mechanisms for ensuring this rotational alignment between the cavity 28 in the drive housing 2 and the motor assembly 30, such as notches and keys on the exterior of the motor assembly 30 and/or on the exterior of the collar 32 partially containing the motor assembly 30.

Figure 13A:
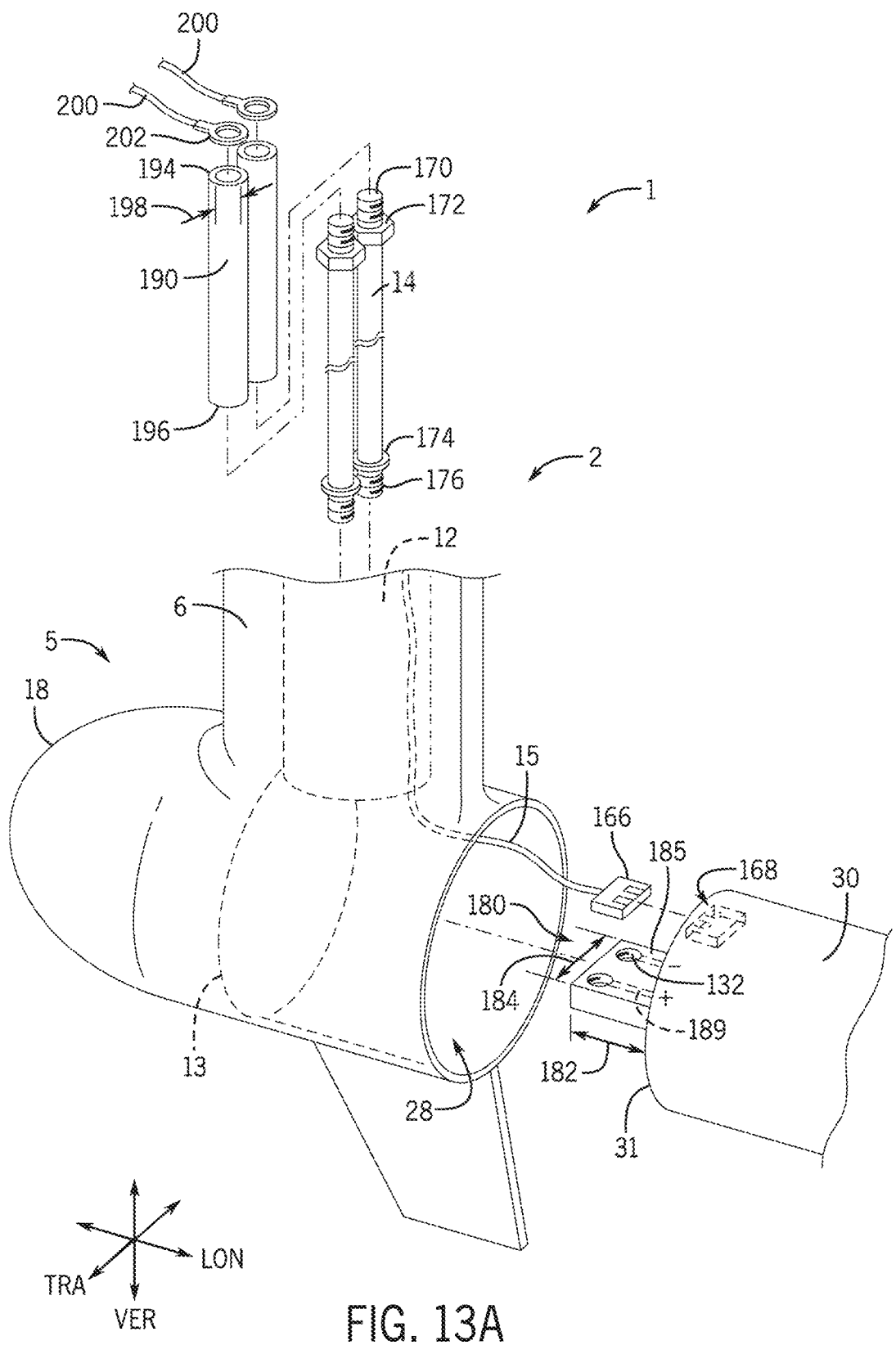
FIG. 13A is a partial exploded view of another example of a marine propulsion device according to the present disclosure.
Figure 13B:
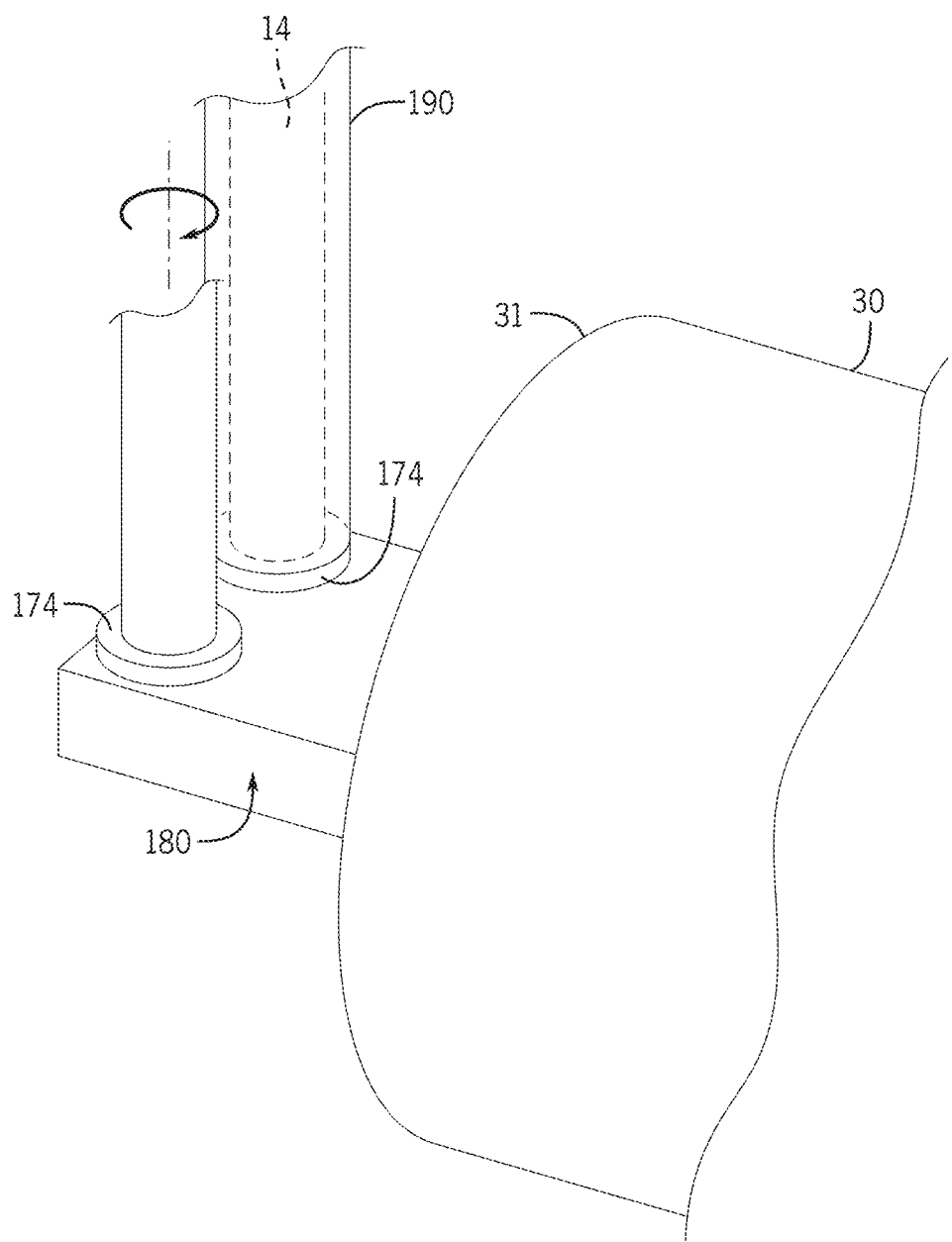
FIG. 13B is a close-up view of part of the propulsion device shown in FIG. 13A.

FIGS. 13A and 13B show a configuration in which the conductors 14 are threadingly engaged with the motor assembly 30, rather than threadingly engaging a connector body 60 fixed within the cavity 28 as discussed above.

However, it should be recognized that the configurations of the conductors 14 and other aspects of this configuration as discussed here also apply to embodiments in which the conductors 14 threadingly engage the connector body 60 (e.g., the connector body 60 of FIG. 9). Like the member 130 of the connector body 60 in FIG. 9, a member 180 extends perpendicularly away from the motor assembly 30 in the longitudinal direction LON, here by a depth 182. The member 180 in certain examples may be added to an existing motor assembly presently known in the art, for example as a 90-degree angle bracket electrically coupled to other electrical contacts on the existing motor assembly. It should be recognized that in this case, multiple brackets may be required (e.g., one per connection) to ensure electrical isolation therebetween. The member 180 also extends a width 184 in the transverse direction TRA and has a thickness between a top 185 and an opposite bottom 187 in the vertical direction VER. Two threaded openings 132 are provided in the vertical direction of the member 180, extending downwardly from the top 185 thereof. An exterior of the member 180 is made of an insulated material such that the two threaded openings 132, while each electrically connected via wires 189 to the motor assembly 30, are electrically isolated from each other.

The depth 182 of the member 180 provides that the threaded openings 132 are aligned in the longitudinal direction LON and in the transverse direction TRA with the second end 44 of the conduit 12 that opens into the cavity 28 when the motor assembly 30 is positioned within the cavity 28. In this manner, the conductors 14 extending through the conduit 12 are also aligned in the longitudinal direction LON and in the transverse direction TRA with the member 180. The conductors 14 are rigid and extend between a first end 170 and a second end 176, also having threads at each of the first end 170 and the second end 176. The conductors 14 may be made of any conductive material, such as steel, in some cases of a flexible conductive material with a rigid frame (e.g., a stranded wire within a plastic conduit). The threads of the second end 176 of the conductors 14 correspond to the threaded openings 132 in the member 180 of the motor assembly 30. In this manner, the member 180 is a motor-side connection that is electrically coupled to the conductors 14 by threading the second ends 176 of the conductors 14 into the threaded openings 132 of the member 180.

With continued reference to FIGS. 13A and 13B, a shelf 174 is provided near the second end 176 of the conductor 14 and extends radially outwardly from the central portion of the conductor 14. The shelf 174 limits how far the conductor 14 may be threaded into the member 180 of the motor assembly 30, as shown in FIG. 13B. A similar shelf 172 if provided near the first end 170 of the conductor 14, which in this configuration has a hexagonal shape. The shelf 172 is provided such that the installer may engage a tool to rotatably install the conductor 14 within the member 180, such a socket driver. In this manner, each of the conductors 14 is connected, from above the second end 44 of the conduit 12, to the motor assembly 30 after the motor assembly 30 is fully positioned in the cavity 28 in the lower casing 6.

The threads at the first ends 170 of the conductors 14 provide for coupling the conductors 14 to other wires 200 that are electrically coupled to the power source, such as via ring terminals 202 thereon. A wingnut, nut, or other fastener may be used to retain the other wires 200 on the conductors 14. In certain examples, insulating tubes 190 are positioned around the conductors 14 to provide shielding therebetween, and shielding with the conduit 12. The insulating tubes 190 are cylindrical tubes extending between a first end 194 and a second end 196, having an inner diameter 198 to accommodate the shelf 174 and/or shelf 172 of the conductor 14. By way of example, the insulating tubes 190 may be made of plastic, fiberglass, waxed paper, or other materials that ensure that the two conductors 14 remain isolated from each other. The conductors 14 and/or the insulating tubes 190 may further include features to prevent them from removal once installed (e.g., a locking tab or a RADSOK connector produced by Amphenol®).

Figure 14A:
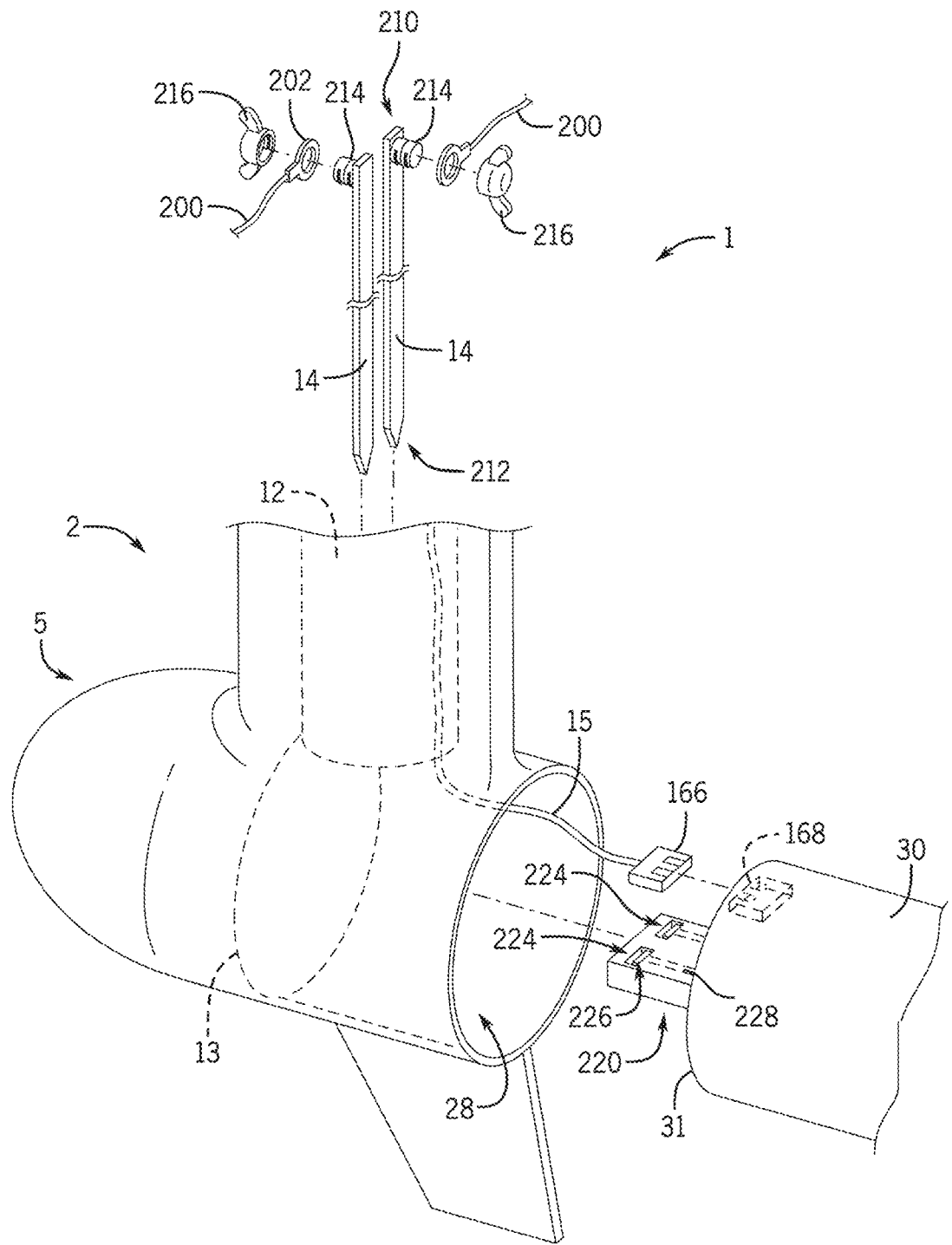
FIG. 14A is a partial exploded view of another example of a marine propulsion device according to the present disclosure.
Figure 14B:
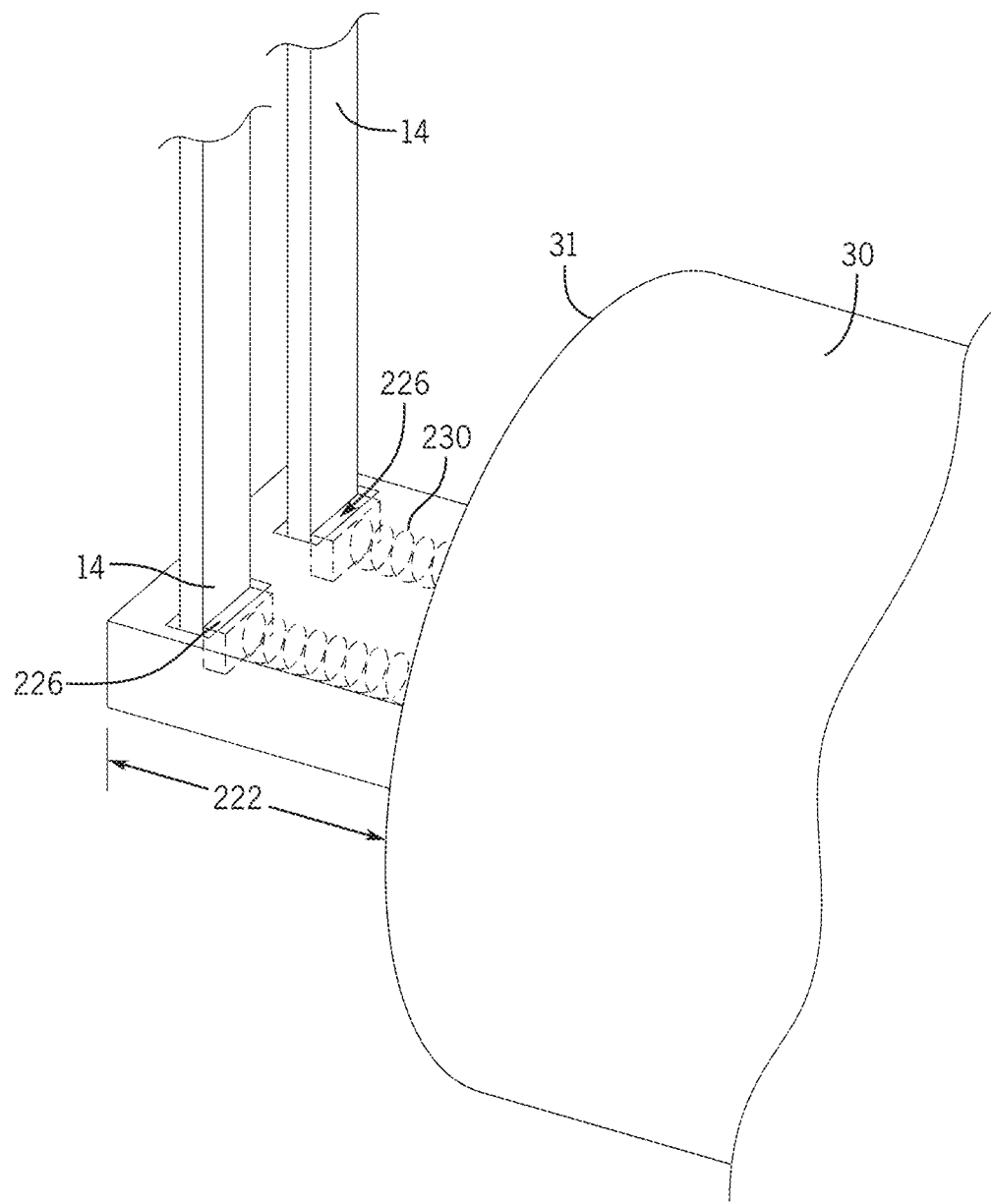
FIG. 14B is a close-up view of part of the propulsion device shown in FIG. 14A.

Another configuration of a marine propulsion device 1 according to the present disclosure is shown in FIGS. 14A and 14B. In this example, the conductors 14 are prismatically shaped, for example similar to a bus bar or bar stock. The conductors 14 extend between a first end 210 and a second end 212. The second end 212 may be angled or tapered to assist in seating the conductors 14 within a connector of the motor assembly 30, which is discussed further below. A threaded stud 214 or other connection feature is provided near the first end 210. The threaded stud 214 allows other wires 200 connected to the power source to be connected to the conductors 14 via wingnuts 216 or other techniques known in the art. Insulating tubes (not shown) may be used in the same manner as the example of FIGS. 13A and 13B. The conductors 14 and/or the insulating tubes 190 may further include features to prevent them from removal once installed (e.g., a locking tab or a RADSOK connector produced by Amphenol).

A member 220 extends from the first end 31 of the motor assembly 30 in a similar manner to the member 180 of FIGS. 13A and 13B but is configured for non-threaded engagement with the conductors 14. Openings 224 extend through the top and bottom of the member 220, which as discussed above for the member 180 of FIGS. 13A and 13B are electrically isolated from each other. Connection pins 226 are provided within each of the openings 224, which are electrically coupled to the motor assembly 30 via wires 228. As shown in FIG. 14B, the connection pins 226 are biased via springs 230 away from the motor assembly 30 to partially close off the openings 224 in the member 220. When the conductors 14 are inserted downwardly into the openings 224 in the member 220 (from above via the conduit 12), the tapered shape of the second end 212 counteracts the biases of the springs 230. This forces the connection pins 226 towards the motor assembly 30, thereby allowing the conductors 14 to fully enter the openings 224. The springs 230 force the connection pins 226 into contact with the conductors 14, thereby providing for electrically coupling the conductors 14 to the motor assembly 30. Alternative devices may be used for the connection pin 226 and/or spring 230, which may be combined into a single device.

It should be recognized that in certain embodiments according to the present disclosure, electrically coupling the motor assembly and the conductor prevents the motor assembly from being removed from the cavity (e.g., the configurations of FIGS. 13A-13B and FIGS. 14A-14B). In this case, the motor assembly of a fully assembled marine propulsion device may be removed from the cavity by first disengaging the electrical coupling between the motor assembly and the conductors. It should further be recognized that other steps may also be required before the motor assembly can be removed from the cavity, such as removing the collar 32 discussed above (see FIG. 1).

Figure 15:
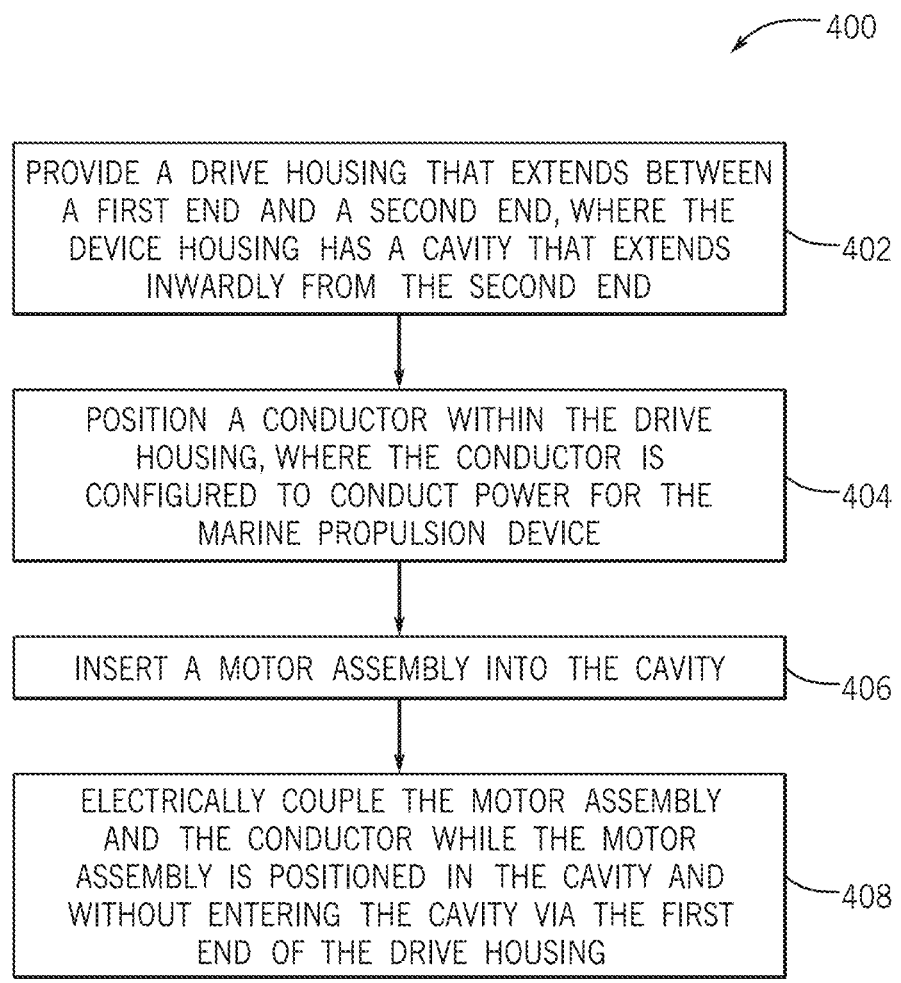
FIG. 15 depicts a flow chart of a method for making a marine propulsion device according to the present disclosure.

FIG. 15 depicts one example of a method 400 for making a marine propulsion device according to the present disclosure. A drive housing is provided in step 402, whereby the drive housing extends between a first end and a second end and have a cavity that extends inwardly from the second end. In step 404 a conductor is positioned within the drive housing. The conductor is configured to conduct power for the marine propulsion device, such as from one or more batteries. In step 406 a motor assembly is inserted into the cavity. Step 408 provides for electrically coupling the motor assembly and the conductor while the motor assembly is positioned in the cavity and without entering the cavity via the first end of the drive housing.

It should be recognized that marine propulsion devices presently known in the art are not made via the method 400 of FIG. 15. With reference to the marine propulsion device of FIGS. 3 and 4, the motor assembly 330 is electrically coupled with the conductors 314 by removing the nose cone 318 from a lower casing 306 of the drive housing 302, inserting the motor assembly 330 into the cavity 328 extending inwardly from the second end 307 of the drive housing 302, and subsequently entering the cavity 328 via the first end 305 of the drive housing 302 to attain access for electrically coupling the conductors 314 with connections 346 of the motor assembly 330.

In this manner, the present disclose provides for electrically coupling a motor assembly to a power source in a simplified manner, without having to remove a nose cone or otherwise enter the front end of the cavity containing the motor assembly, and/or using wires that do not bend sufficiently enough to permit connections to the motor assembly when the motor assembly is outside the drive housing, including via rigid wires.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for making a marine propulsion device, the method comprising:
    providing a drive housing that extends between a first end and a second end, the drive housing having a cavity that extends inwardly from the second end;
    positioning a conductor within the drive housing, the conductor being configured to conduct power for the marine propulsion device;
    inserting a motor assembly into the cavity; and
    electrically coupling the motor assembly and the conductor while the motor assembly is positioned in the cavity and without entering the cavity via the first end of the drive housing.

2. The method according to claim 1, wherein the drive housing extends between the first end and the second end in a longitudinal direction, wherein the motor assembly comprises a connector for electrically coupling the motor assembly, and wherein electrically coupling the motor assembly and the conductor comprises moving the conductor in a vertical direction perpendicular to the longitudinal direction into engagement with the connector of the motor assembly.

3. The method according to claim 2, wherein electrically coupling the motor assembly and the conductor further comprises threading a first end of the conductor into a threaded opening in the connector of the motor assembly.

4. The method according to claim 3, wherein the conductor is a rigid member extending between the first end and a second end, and wherein electrically coupling the motor assembly and the conductor further comprises rotating the conductor at a position closer to the second end of the conductor than to the first end of the conductor to thread the first end of the conductor into the threaded opening in the conductor.

5. The method according to claim 4, wherein the marine propulsion device is configured to be electrically coupled to a power source to power the motor assembly, further comprising electrically coupling the conductor to the power source via threads at the second end of the conductor.

6. The method according to claim 1, wherein the conductor is a first conductor, further comprising positioning a second conductor within the drive housing, the second conductor being electrically isolated from the first conductor, and further comprising electrically coupling the motor assembly and the second conductor while the motor assembly is positioned in the cavity and without entering the cavity via the first end of the drive housing.

7. The method according to claim 1, wherein the motor assembly comprises a motor-side connector for electrically coupling the motor assembly, further comprising positioning a housing-side connector in the drive housing and electrically coupling the conductor to the housing-side connector, the housing-side connector being positioned such inserting the motor assembly into the cavity until the motor-side connector and the housing-side connector mate electrically couples the motor assembly and the conductor.

8. The method according to claim 7, wherein the housing-side connector is part of a connector body comprising two shells, the housing-side connector extending through one of the two shells, and wherein electrically coupling the conductor and the housing-side connector comprises sandwiching the conductor between the two shells such that the conductor is held in contact with the housing-side connector.

9. A marine propulsion device comprising:
    a drive housing extending between a first end and a second end in a longitudinal direction, wherein a cavity extends inwardly from the second end, and wherein a conduit extends away from the cavity in a substantially vertical direction within the drive housing, the vertical direction being perpendicular to the longitudinal direction;
    a motor assembly positioned within the cavity; and
    a conductor comprising a rigid member that extends within the conduit and is electrically coupled to the motor assembly and is configured to provide power to the motor assembly;
    wherein the motor assembly and the conductor are configured to be electrically coupled from outside the cavity while the motor assembly is positioned within the cavity by virtue of the rigid member extending within the conduit that extends away from the cavity.

10. The marine propulsion device according to claim 9, wherein the conduit has a first end that opens into the cavity, wherein the motor assembly comprises a connector for electrically coupling the motor assembly, and wherein the connector is aligned in the longitudinal direction with the first end of the conduit when the motor assembly is positioned within the cavity.

11. The marine propulsion device according to claim 10, wherein the connector and the conductor are electrically coupled via threaded engagement therebetween.

12. The marine propulsion device according to claim 9, wherein the first end and the second end of the drive housing are separated by a first distance in the longitudinal direction, and wherein the cavity extends into the drive housing in the longitudinal direction by a second distance that is less than the first distance between the first end and the second end of the drive housing.

13. The marine propulsion device according to claim 9, wherein electrically coupling the motor assembly and the conductor prevents the motor assembly from being removed from the cavity.

14. The marine propulsion device according to claim 9, wherein the conductor is a first conductor, further comprising a second conductor comprising a rigid member that extends through the conduit and is electrically coupled at one end with the motor assembly, wherein the first conductor and the second conductor are electrically isolated from each other.

15. The marine propulsion device according to claim 14, further comprising a power source that provides power to the motor assembly via the first conductor and the second conductor.

16. A marine propulsion device configured to be powered by a power source, the marine propulsion device comprising:
   a drive housing extending between a first end and a second end, wherein a cavity extends inwardly from the second end;
   a housing-side connector positioned within the cavity;
   a conductor having a first end electrically coupled to the housing-side connector and an opposite second end configured to be electrically coupled to the power source; and
   a motor assembly positioned within the cavity, the motor having a motor-side connector configured to mate with the housing-side connector when the motor assembly is moved towards the housing-side connector within the cavity;
   wherein the motor assembly is electrically coupled to the power source by mating the motor-side connector and the housing-side connector.

17. The marine propulsion device according to claim 16, wherein the motor-side connector comprises a pin and the housing-side connector comprises a socket configured to receive the pin therein.

18. The marine propulsion device according to claim 16, further comprising a member that extends away from the motor assembly to prevent rotational misalignment between the motor assembly and the drive housing to thereby ensure that the motor-side connector and the housing-side connector mate when the motor assembly is positioned within the cavity.

19. The marine propulsion device according to claim 16, wherein the housing-side connector is part of a connector body comprising two shells, the housing-side connector extending through one of the two shells, and wherein the first end of the conductor is sandwiched between the two shells so as to electrically couple the first end of conductor and the housing-side connector.

20. The marine propulsion device according to claim 19, wherein the drive housing extends between the first end and the second end in a longitudinal direction, wherein a conduit extends away from the cavity in a substantially vertical direction within the drive housing, the vertical direction being perpendicular to the longitudinal direction, and wherein the conductor comprises a rigid member that extends within the conduit such that the motor assembly and the conductor are configured to be electrically coupled from outside the cavity while the motor assembly is positioned within the cavity by virtue of the rigid member extending within the conduit that extends away from the cavity.

* * * * *